US 8,895,894 B2

(12) United States Patent
Matsumoto et al.

(10) Patent No.: US 8,895,894 B2
(45) Date of Patent: Nov. 25, 2014

(54) ELECTRIC SPOT WELDING GUN

(75) Inventors: Koichi Matsumoto, Tochigi (JP); Hiroshi Miwa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 13/197,093

(22) Filed: Aug. 3, 2011

(65) Prior Publication Data

US 2012/0031884 A1    Feb. 9, 2012

(30) Foreign Application Priority Data

Aug. 4, 2010   (JP) ................. 2010-175098

(51) Int. Cl.
*B23K 11/30*    (2006.01)
*B23K 11/11*    (2006.01)
*B23K 11/31*    (2006.01)

(52) U.S. Cl.
CPC ............... *B23K 11/115* (2013.01); *B23K 11/31* (2013.01)
USPC .... 219/127; 219/78.01; 219/86.1; 219/86.25; 219/86.41

(58) Field of Classification Search
CPC ...... B23K 11/31; B23K 11/115; B23K 9/007; B23K 9/0026
USPC .......... 219/78.01, 79, 80, 86.1, 86.25, 86.33, 219/86.41, 86.9, 87, 88, 89, 91.1, 91.2, 219/117.1, 118, 86.51, 86.61, 127, 137.31; 318/653, 661, 400.37, 400.38, 400.39, 318/400.4
See application file for complete search history.

(56) References Cited

U.S. PATENT DOCUMENTS

| 4,501,950 | A | * | 2/1985 | Richardson | 219/124.34 |
|---|---|---|---|---|---|
| 5,492,029 | A | * | 2/1996 | Obrist | 74/409 |
| 6,337,456 | B1 | * | 1/2002 | Taniguchi et al. | 219/86.25 |
| 7,067,768 | B2 | * | 6/2006 | Miwa et al. | 219/137.31 |
| 2004/0208031 | A1 | | 10/2004 | Miwa et al. | |
| 2007/0164008 | A1 | * | 7/2007 | Koshiishi et al. | 219/137.2 |
| 2007/0228018 | A1 | * | 10/2007 | Murai et al. | 219/86.25 |

FOREIGN PATENT DOCUMENTS

| CN | 1509218 A | 6/2004 |
|---|---|---|
| JP | 2002-028788 A | 1/2002 |

OTHER PUBLICATIONS

Office Action issued to CN Application 21110220594.3, mailed Nov. 1, 2013.

* cited by examiner

Primary Examiner — Dana Ross
Assistant Examiner — James Sims, III
(74) Attorney, Agent, or Firm — Carrier Blackman & Associates, P.C.; William D. Blackman; Joseph P. Carrier

(57) ABSTRACT

An electric spot welding gun (10) includes: a servo motor (40); a push rod (50) that advances and retracts in response to rotation of a rotor (43) of the servo motor; a drive-side electrode tip (71) that is mounted to a drive-side arm (70) fixed to a leading end of the push rod; and an encoder (60) that detects the rotation angle of the rotor of the servo motor, the position of the electrode tip being offset relative to the push rod, in which the rotor and the encoder are disposed in parallel to each other in an offset plane on which the electrode tip is offset relative to the push rod, at an attitude in which a trailing end (44) of the rotor on a side opposite to a push rod side thereof and an input end (64) of the encoder are facing in the same direction.

16 Claims, 5 Drawing Sheets

ELECTRIC SPOT WELDING GUN

This application is based on and claims the benefit of priority from Japanese Patent Application No. 2010-175098, filed on 4 Aug. 2010, the content of which is incorporated herein by reference.

BACKGROUND OF THE INVENTION

1. Field of the Invention

The present invention relates to an electric spot welding gun. In particular, the present invention relates to an electric spot welding gun in which one electrode tip among a pair of electrode tips used in spot welding is opened and closed relative to the other electrode tip using a servo motor.

2. Related Art

Conventionally, in this type of electric spot welding gun, rotational motion of the rotor of the servo motor is converted to advancing or retracting motion in an axial direction through a feed screw mechanism configured by a ball screw and a nut. An opening/closing operation of one electrode tip is performed using this advancing and retracting motion (for example, refer to Japanese Unexamined Patent Application Publication No. 2002-028788).

A schematic block diagram of a conventional electric spot welding gun 110 is shown in FIG. 1. As shown in FIG. 1, the electric spot welding gun 110 includes a motor drive unit 130 including a servo motor and a feed screw mechanism, and a push rod 150 that is made to advance or retract by way of the rotation of the servo motor in the motor drive unit 130. One electrode tip 171 is mounted to an arm 170 fixed to a leading end of the push rod 150.

In addition, with the electric spot welding gun 110, the timing at which current is flowed between both electrode tips when the one electrode tip 171 moves to a certain position is precisely determined; therefore, the movement position of the one electrode tip 171 relative to the other electrode tip (not illustrate) must be precisely known.

As a result, an encoder 160 for detecting the rotation angle of the rotor of the servo motor has conventionally been provided.

With the conventional electric spot welding gun 110, the encoder 160 is connected in series to the rear of the rotor (opposite side to the feed screw mechanism side thereof extending from the rotor forward) of the servo motor. In other words, the rotating shaft of the encoder 160 is disposed coaxially at a position at which the rotating shaft of the rotor of the servo motor extends rearwards.

In this case, the rotating shaft of the encoder 160 is mounted to the rear of the rotating shaft of the rotor either directly or using a joint such as a coupling, whereby the rotation of the rotor is transmitted to the encoder 160.

In addition, for the purpose of not restricting the shapes of the components to be the welding targets, the electric spot welding gun 110 in which the press point (position of the electrode tip 171) is offset from the push rod 150 (pressing axis by the servo motor), as shown in FIG. 1, has been used recently. With such an electric spot welding gun 110, the moment acts on the push rod 150 during pressing.

As a result, with the conventional electric spot welding gun 110, a structure is established in which the shaft bushing 200 is disposed at a forward portion of the motor drive unit 130, and the moment acting on the push rod 150 during pressing is received by this shaft bushing 200.

SUMMARY OF THE INVENTION

Incidentally, a reduction in size of a motor drive unit that includes a servo motor and feed screw mechanism has been demanded in recent electric spot welding guns. In particular, shortening of the overall length (length in axial direction) of the motor drive unit has been demanded.

However, with the conventional electric spot welding gun 110, the encoder 160 is connected in series to the rear of the rotor of the servo motor. The length of the encoder 160 in the axial direction also adds to the overall length of the motor drive unit 130.

As a result, such an arrangement for the encoder 160 becomes an obstacle upon shortening the overall length of the motor drive unit 130, and thus shortening the overall length thereof has been difficult.

In addition, with the conventional electric spot welding gun 110, the shaft bushing 200 that receives the moment acting on the push rod 150 during pressing is disposed at a forward portion of the motor drive unit 130. The length of this shaft bushing 200 in the axial direction also adds to the overall length of the motor drive unit 130.

The length of the shaft bushing 200 must be lengthened to accept the load by the moment, and thus it is unavoidable but to extend the overall length of the motor drive unit 130 by this amount.

As a result, such an arrangement of the shaft bushing 200 becomes an obstacle upon shortening the overall length of the motor drive unit 130, and thus shortening of the overall length thereof has been difficult.

The present invention has been made taking the aforementioned problems into account, and has an object of providing an electric spot welding gun that can achieve a reduction in the size of the motor drive unit and, in particular, can shorten the overall length (length in the axial direction) of the motor drive unit.

An electric spot welding gun according to the present invention includes: a servo motor; a push rod that advances and retracts according to rotation of a rotor of the servo motor; a first electrode tip that is mounted to an arm fixed to a leading end of the push rod; an encoder that detects a rotational angle of the rotor of the servo motor; and a set of pressing guides that is fixed integrally with the push rod and extends in parallel with the push rod, in which a position of the first electrode tip is offset relative to the push rod, the rotor and the encoder are disposed in parallel to each other in an offset plane on which the electrode tip is offset relative to the push rod, at attitudes at which a trailing end of the rotor on a side opposite a push rod side thereof and an input end of the encoder are facing the same direction, and the set of pressing guides interpose the offset plane so as to be disposed on both sides thereof.

According to the present invention, the rotor and the encoder are disposed in parallel to each other in an offset plane on which the first electrode tip is offset relative to the push rod, at attitudes at which the trailing end of the rotor on a side opposite to the push rod side thereof and the input end of the encoder are facing in the same direction. For example, for a conventional case of the encoder being connected in series to the rear of the rotor of the servo motor, for example, a structure is established in which this encoder is turned back to the rotor of the servo motor.

Therefore, compared with this case of the encoder being connected in series to the rear of the rotor, for example, the overall length of the motor drive unit (length in axial direction) can be effectively shortened, whereby the motor drive unit can be reduced in size.

In addition, according to the present invention, the set of pressing guides integrally fixed with the push rod and extending in parallel with the push rod interpose the offset plane, and thus are disposed on both sides thereof.

Compared to a case of a shaft bushing receiving the moment acting on the push rod 50 when pressing being disposed in series at a forward portion of the motor drive unit 30, for example, the overall length (length in axial direction) of the motor drive unit 30 can be efficiently shortened, whereby the motor drive unit 30 can be reduced in size.

In addition, by the set of pressing guides interposing the offset plane and thus being disposed on both sides thereof, the pressing guides can be installed at positions as close as possible to the press point (electrode tip).

The moment acting on the pressing guides is thereby made relatively small, thereby improving the rigidity of the electric spot welding gun.

In addition, the size of the point holder, which connects the three axes of the press guides and the push rod, can be decreased, whereby the electric spot welding gun itself can be reduced in size and lightened.

In this case, it is preferable for the electric spot welding gun to further include: a transformer; a flexible conductor for flowing current from the transformer to the first electrode tip; and an equalizing mechanism that can absorb displacement of a work when a work is sandwiched between the first electrode tip and a second electrode tip opposing the first electrode tip, the equalizing mechanism including: a set of equalizing guides that extend in parallel with the pressing guides; and a set of floating members that impart a floating function to the set of equalizing guides, in which the set of pressing guides, the set of equalizing guides, and the set of floating members are disposed in this order from nearest the push rod when viewed from an axial direction of the rotor, the encoder is disposed at an intermediate position of the set of pressing guides, and the flexible conductor is disposed at an intermediate position of the set of equalizing guides and an intermediate position of the set of floating members.

According to the present invention, when viewed from the shaft line direction of the rotor, the set of pressing guides, the set of equalizing guides, and the set of floating members are disposed in this order from nearest to the push rod. In other words, the pressing guides, which receive a larger load than the equalizing guides, are disposed the nearer to the press point (electrode tip).

The rigidity of the electric spot welding gun is thereby increased, and the durability improved.

In addition, by disposing the equalizing guides at positions as close to the push rod as possible, the load (moment) on the equalizing mechanism generated by the equalize counterforce, sticking of the welding tips to a workpiece, and the like can be reduced, and the rigidity of the equalizing guides can be raised.

Furthermore, the floating members imparting a floating function to the equalizing guides are not disposed in series in the axial direction relative to the equalizing guides, but rather are disposed in parallel.

The overall length (length in axial direction) of the motor drive unit can thereby be shortened, whereby the motor drive unit can be reduced in size.

In addition, according to the present invention, a flexible conductor is disposed at an intermediate position of the set of equalizing guides and an intermediate position of the set of floating members.

Both sides of the flexible conductor can thereby avoid the risk of being exposed to a direct hit of sputter accompanying welding, and thus the life-span of the flexible conductor is extended In addition, the flexible conductor itself can be directly connected to the transformer.

The secondary conductor required in a case of a structure in which the flexible conductor cannot be directly connected to the transformer is no longer necessary, whereby the number of components can be reduced.

Moreover, by directly connecting the flexible conductor itself to the transformer, the conductor path in which welding current flows is shorter, the electrical resistance of the conductor declines, and the output load on the transformer can be reduced. Furthermore, the cooling water path for cooling the conductor path can be shortened.

According to the present invention, in an electric sport welding gun in which the position of an electrode tip is offset relative to a push rod, the overall length of a motor drive unit (length in axial direction) can be effectively shortened, whereby the motor drive unit can be reduced in size.

DETAILED DESCRIPTION OF THE INVENTION

Figure 1:
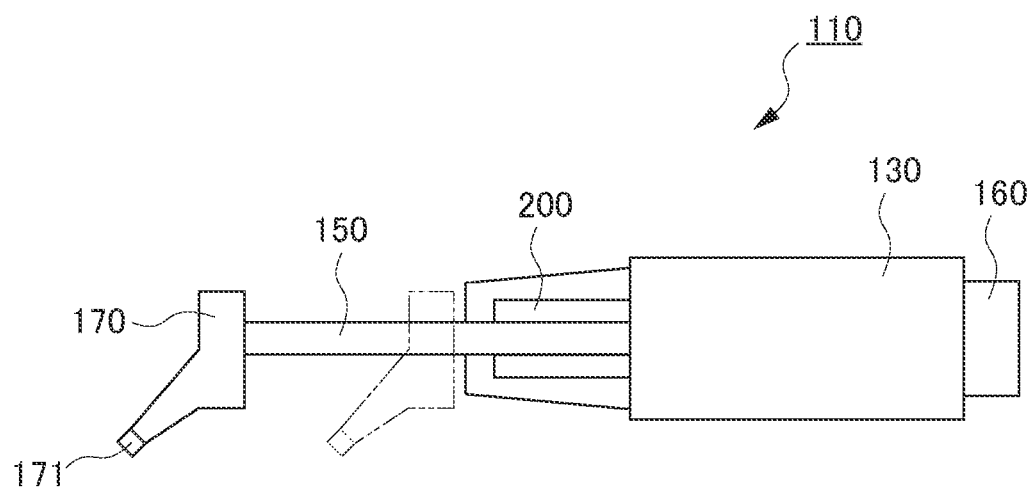
FIG. 1 is a schematic view showing a conventional electric spot welding gun.

An embodiment of the present invention will be explained hereinafter while referring to the drawings.

Figure 2:
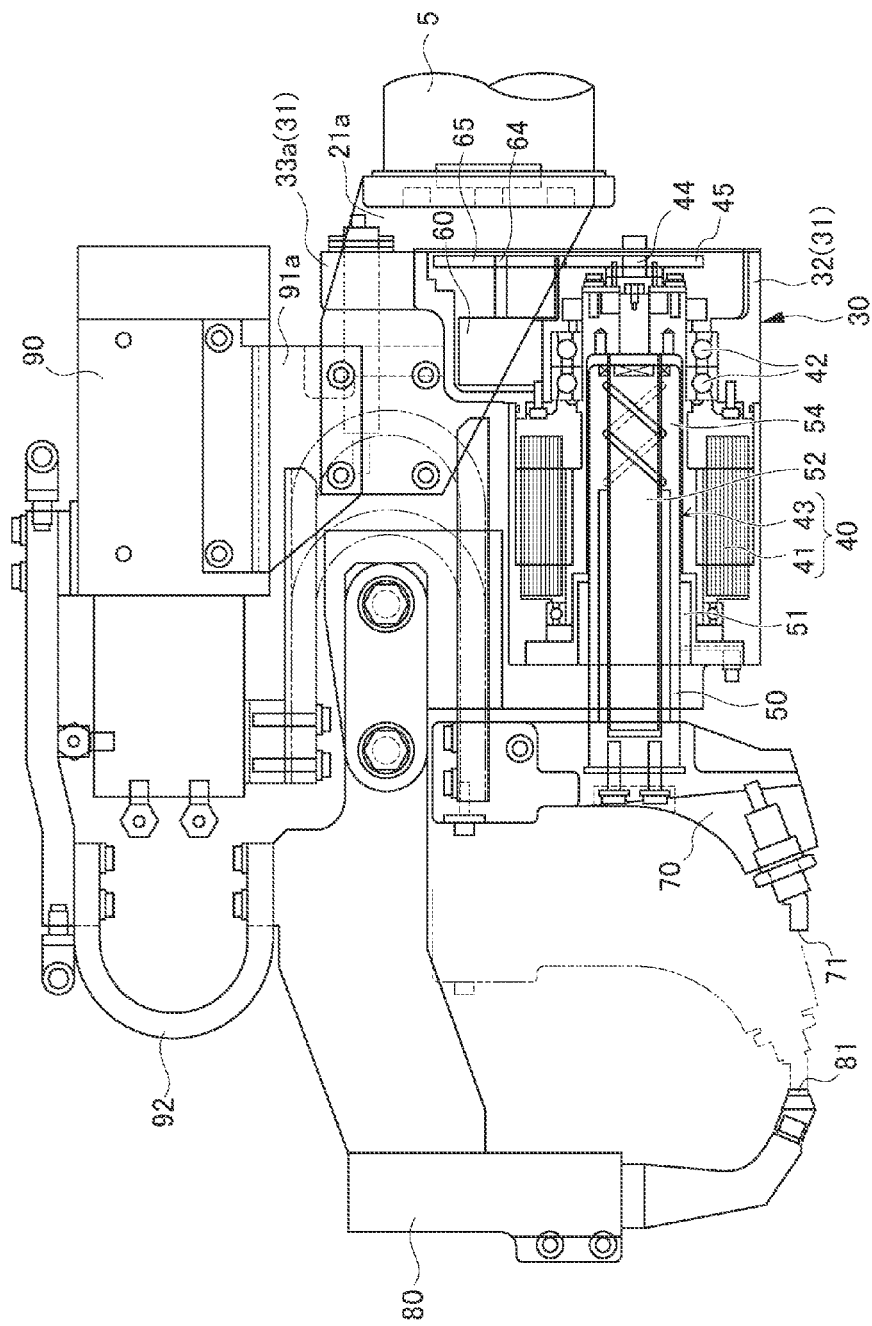
FIG. 2 is a side view showing a cross-section of a relevant part of an electric spot welding gun according to an embodiment of the present invention.
Figure 3:
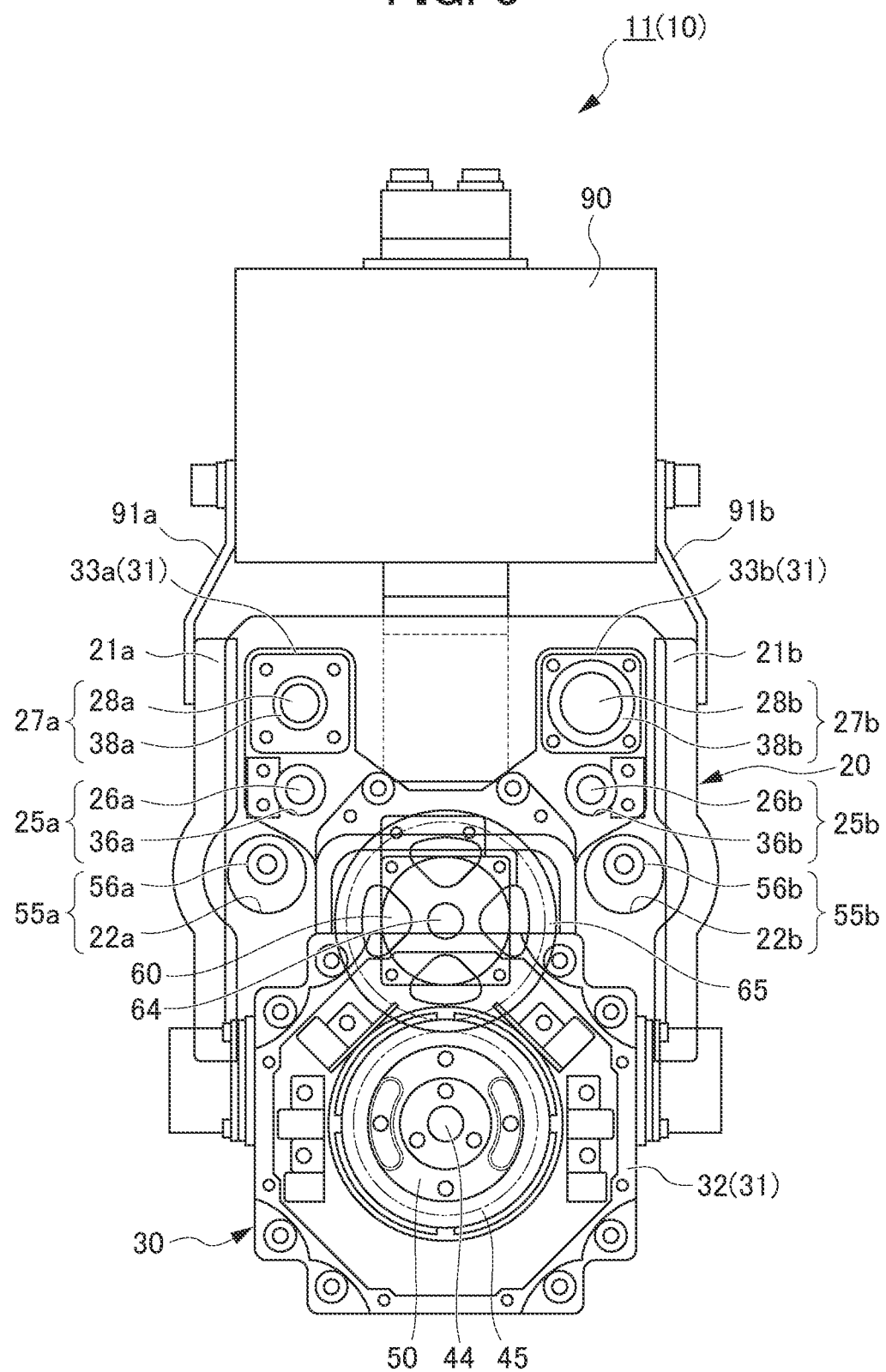
FIG. 3 is an enlarged cross-sectional rear view of the electric spot welding gun shown in FIG. 2.
Figure 4:
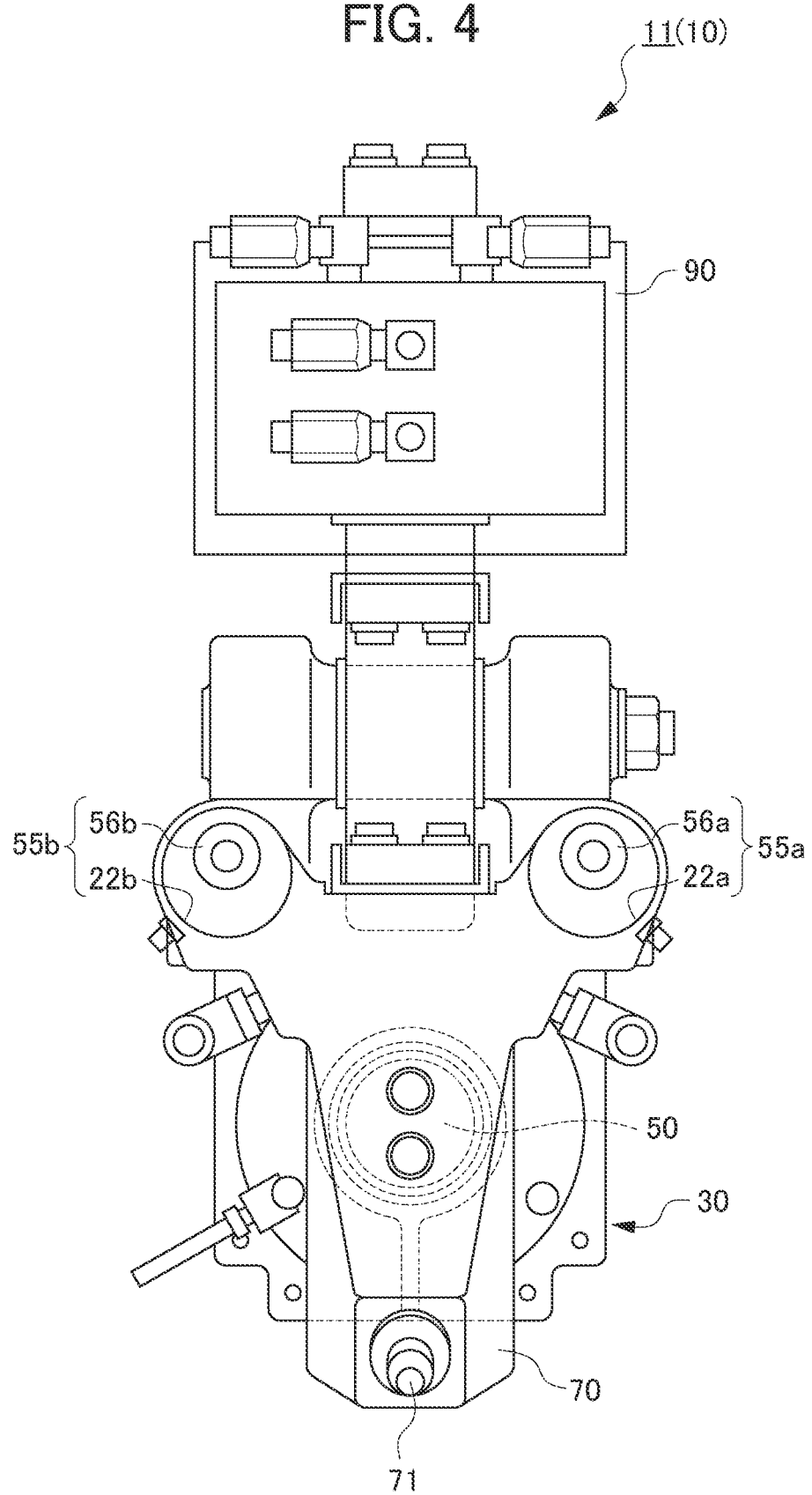
FIG. 4 is an enlarged front view of the electric spot welding gun shown in FIG. 2 omitting a slave side arm and an ounce copper plate.

FIG. 2 is a side view showing a cross section of a relevant part of an electric spot welding gun 10 according to an embodiment of the present invention. FIG. 3 is an enlarged cross-sectional rear view. FIG. 4 is an enlarged front view omitting a slave side arm and an ounce copper plate.

The electric spot welding gun 10 includes a gun body 11 that is mounted to an arm 5 of a welding robot (not illustrated) via an equalizing mechanism 20.

In addition to the equalizing mechanism 20, the gun body 11 includes a motor drive unit 30, a drive side arm 70, a slave side arm 80, and a transformer 90.

The equalizing mechanism 20 includes left and right frames 21a, 21b, a left and right set of equalizing guides 25a, 25b, and a left and right set of floating members 27a, 27b that imparts a floating function to the equalizing guides 25a, 25b.

The frames 21a, 21b are fixed to the arm 5 of the welding robot (not illustrated).

The equalizing guides 25a, 25b include a left and right set of equalizing guide bars 26a, 26b that are fixed to the frames 21a, 21b and extend in the front-back direction.

The floating members 27a, 27b include a left and right set of a damper and spring 28a, 28b, the left side being the damper 28a and the right side including the spring 28b.

The motor drive unit 30 includes a unit housing 31, a servo motor 40, a push rod 50, and an encoder 60.

The unit housing 31 includes a main housing 32 that houses the servo motor 40, the push rod 50 and the encoder 60, and sub housings 33a, 33b extending at the left and right upper side of the main housing 32.

A left and right set of equalizing guide holes 36a, 36b that houses the left and right set of equalizing guide bars 26a, 26b is formed in the sub housings 33a, 33b, respectively. The left and right set of equalizing guides 25*a*, 25*b* are configured by the equalizing guide bars 26*a*, 26*b* and equalizing guide holes 36*a*, 36*b*, respectively.

A left and right set of damper and spring holes 38*a*, 38*b* that houses the left and right set of damper and spring 28*a*, 28*b* is formed in the sub housings 33*a*, 33*b*, respectively. A left and right set of floating members 27*a*, 27*b* is configured by the damper and spring 28*a*, 28*b* and the damper and spring holes 38*a*, 38*b*, respectively.

The servo motor is configured by a stator 41 fixed inside of the main housing 32, and a hollow rotor 43 that is rotatably supported inside of the main housing 32 via small angular bearings 42.

The push rod 50 is a hollow rod. The push rod 50 is disposed in a hollow portion of the rotor 43 through a guide sleeve 51 provided at a leading end side of the main housing 32. The guide sleeve 51 is for steadying the rotation of the push rod 50, and has a length that is very short compared to a conventional shaft bushing 200 (refer to FIG. 1).

The trailing end of the push rod 50 is configured integrally with a nut 54 that threads with a ball screw 52.

A trailing side of the ball screw 52 is fixed at the base side of the rotor 43, and the ball screw 52 extends along a shaft line of the push rod 50 inside the hollow portion of the push rod 50. As a result, the ball screw 52 rotates integrally with the rotor 43 accompanying rotation of the rotor 43.

Appropriate measures are applied to the nut 54 to prevent the nut from spinning. As a result, when the ball screw 52 rotates accompanying rotation of the rotor 43, the push rod 50 advance or retracts along the axis of the rotor 43 inside of the hollow portion of the rotor 43 with the nut 54.

The push rod 50 includes a left and right set of pressing guides 55*a*, 55*b* that is fixed to the push rod 50 and extend in the front-back direction. The pressing guides 55*a*, 55*b* include a left and right set of pressing guide bars 56*a*, 56*b*, respectively. The pressing guide bars 56*a*, 56*b* are housed in a left and right set of pressing guide holes 22*a*, 22*b* formed in the equalizing mechanism 20. The left and right set of pressing guides 55*a*, 55*b* is configured by the pressing guide bars 56*a*, 56*b* and pressing guide holes 22*a*, 22*b*, respectively.

A gear 45 is mounted to the servo motor 40 at a trailing end 44 of the rotor 43 on a side opposite to the push rod 50 side thereof. This gear 45 is a backlash-free gear called a no backlash gear, non-backlash gear, or the like. For example, it is a gear configured so that torque transmission is possible without backlash, by overlapping two thin gears (spur gears) and drawing both in a circumferential direction by a spring.

The encoder 60 is disposed inside of the main housing 32 in a state setting the rotational axis thereof to be parallel with the rotational axis of the rotor 43. In this case, for the orientation of the encoder 60, the input end 64 thereof faces the same direction as the trailing end of the rotor 43, which extends to a side opposite the side of the push rod 50. In other words, as shown in FIG. 2, when the trailing end 44 of the rotor 43 faces to the right side in FIG. 2, the input end 64 of the encoder 60 also faces to the right side in FIG. 2.

A gear 65 is mounted to the encoder 60 at the input end 64 of a rotational shaft. This gear 65 may be a normal gear (spur gear). The gear 65 engages with the gear 45 mounted to the rotor 43. It will be understood from the drawing of FIG. 2 that in this first embodiment, the gears 45, 65 define a common plane, and the rotor 43 and the encoder 60 are both disposed primarily on the same side of such common plane. This arrangement advantageously contributes to a compact configuration of the electric spot welding gun 10.

The drive-side arm 70 is mounted to a leading end of the push rod 50. A drive-side electrode tip 71 is mounted to the drive-side arm 70 at a position offset from the shaft line direction of the push rod 50 relative to a mounting part to the push rod 50. As shown in FIG. 2, the drive-side electrode tip 71 is offset downwards from the shaft line direction of the push rod 50.

A slave-side electrode tip 81 is mounted to the slave-side arm 80 at a position opposing the drive-side electrode tip 71 of the drive-side arm 70.

The drive-side arm 70 and the slave-side arm 80 are both displaceably supported by the equalizing mechanism 20. As a result, when a work (metal plate material) is sandwiched by the drive-side electrode tip 71 and the slave-side electrode tip 81, even if some displacement (e.g., displacement on the order of 2 to 3 mm) of the work from a predetermined position occurs, the entire body floats to follow the displacement when sandwiching.

The transformer 90 is mounted to the frames 21*a*, 21*b* of the equalizing mechanism 20 via left and right brackets 91*a*, 91*b*. The transformer 90 flows welding current to the drive-side electrode tip 71 and the slave-side electrode tip 81 when the work has been sandwiched by the drive-side electrode tip 71 and the slave-side electrode tip 81.

For this purpose, the transformer 90 includes an ounce copper plate 92 as a flexible conductor for flowing welding current to the drive-side arm 70 provided with the drive-side electrode tip 71 and the slave-side arm 80 provided with the slave-side electrode tip 81 from the transformer 90. The ounce copper plate 92 uses layered thin copper plates folded in a U-shape.

The ounce copper plate 92 is disposed at an intermediate position of the equalizing guides 25*a*, 25*b* and an intermediate position of the floating members 27*a*, 27*b*. Specifically, the ounce copper plate 92 is disposed in the center of the electric sport welding gun 10 in the left-right direction.

Conventionally, the ounce copper plate cannot be disposed at the center of an electric spot welding gun in the left-right direction; therefore, the ounce copper plate has been disposed by dividing a secondary conductor (copper plate) into left and right from an electrode mounting portion of the transformer, and facing forward from the right and left thereof. Conventionally, the conductor path in which the welding current flows has been long for this reason, and due to resistance, generates heat. As a result, it has been necessary to cool by circulating water. With the number of components also increasing, the resistance also increases, as well does the flow path of cooling water.

In contrast, with the present embodiment, the ounce copper plate 92 is disposed in the center of the electric spot welding gun 10 in the left-right direction.

The ounce copper plate 92 can thereby be made compact. In addition, a secondary conductor is not necessary, the conductor path in which the welding current flows is shorter, the electrical resistance of the conductor path declines, and thus the cooling water path for cooling the conductor path can be shortened.

Figure 5:
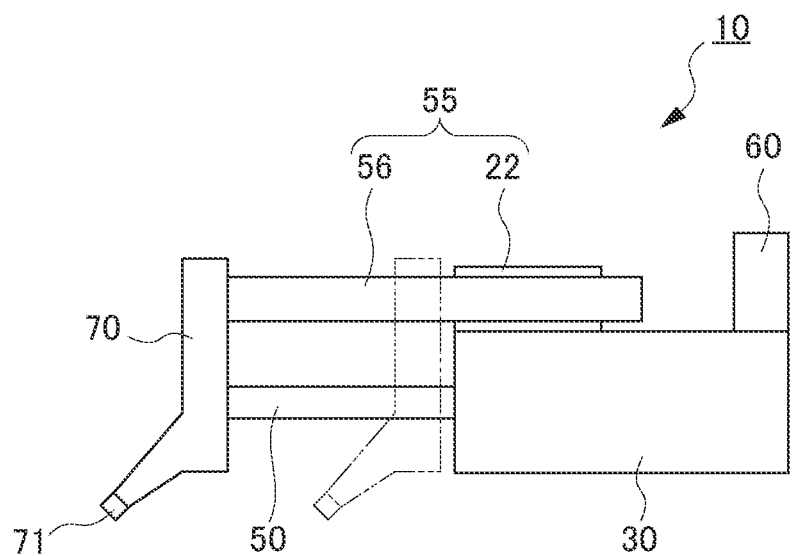
FIG. 5 is a schematic view showing an electric spot welding gun of the present invention.

As shown in FIG. 5, the drive-side electrode tip 71 is offset downwards from the axial direction of the push rod 50 in the electric spot welding gun 10. The encoder 60 is offset upwards from the shaft line direction of the push rod 50. In this case, the encoder 60 does not protrude from the trailing end of the motor drive unit 30 rearwards.

As shown in FIGS. 3 and 5, the pressing guides 55*a*, 55*b* are offset upwards from the shaft line direction of the push rod 50 in the electric spot welding gun 10. The pressing guides 55*a*, 55*b* interpose the encoder 60 when viewed from the shaft line direction, and thus are disposed on both sides thereof.

When the electric spot welding gun 10 configured in the above described way causes the servo motor 40 to drive, the rotor 43 and the ball screw 52 integrated with the rotor 43 rotate. By the ball screw 52 rotating, the nut 54 threaded with the ball screw 52 and the push rod 50 integrated with the nut 54 advances or retracts in the shaft line direction.

The drive-side electrode tip 71 mounted to the leading end of the push rod 50 thereby causes a work (metal plate material) to be sandwiched between the drive-side electrode tip 71 and the opposing slave-side electrode tip 81, and then performs spot welding.

There are the following effects according to the present embodiment.

(1) The rotor 43 and the encoder 60 are disposed in parallel to each other in an offset plane on which the electrode tip 71 is offset relative to the push rod 50, at attitudes at which the trailing end 44 of the rotor 43 on a side opposite to the push rod 50 side thereof and the input end 64 of the encoder 60 are facing in the same direction. For example, for a conventional case of the encoder 60 being connected in series to the rear of the rotor 43 of the servo motor 40, for example, a structure is established in which this encoder 60 is turned back to the rotor 43 of the servo motor 40.

Therefore, compared with this case of the encoder 60 being connected in series to the rear of the rotor 43, for example, the overall length of the motor drive unit 30 (length in axial direction) can be effectively shortened, whereby the motor drive unit 30 can be reduced in size.

(2) The set of pressing guides 55a, 55b integrally fixed with the push rod 50 and extending in parallel with the push rod 50 interpose the offset plane, and thus are disposed on both sides thereof.

Compared to a case of a shaft bushing receiving the moment acting on the push rod 50 during pressing being disposed in series at a forward portion of the motor drive unit 30, for example, the overall length (length in axial direction) of the motor drive unit 30 can be effectively shortened, whereby the motor drive unit 30 can be reduced in size.

(3) By the set of pressing guides 55a, 55b interposing the offset plane and thus being disposed on both sides thereof, the pressing guides 55a, 55b can be installed at positions as close as possible to the electrode tip 71 (press point).

In this way the moment acting on the pressing guides 55a, 55b is reduced, thereby improving the rigidity of the electric spot welding gun 10.

In addition, the size of the point holder decreases, whereby the electric spot welding gun 10 itself can be reduced in size and lightened.

(4) When viewed from the shaft line direction of the rotor 43, the set of pressing guides 55a, 55b, the set of equalizing guides 25a, 25b, and the set of floating members 27a, 27b are disposed in this order from nearest to the push rod 50. In other words, the pressing guides 55a, 55b, which receive the largest load, are disposed the nearest to the push rod 50, then the equalizing guides 25a, 25b, which receive the next largest load, are disposed next nearest to the push rod 50.

The rigidity of the electric spot welding gun 10 is thereby increased and the durability improved.

(5) By disposing the equalizing guides 25a, 25b at positions as close to the push rod 50 as possible, the load (moment) on the equalizing mechanism generated by the equalizing counterforce, sticking of the welding tips (electrode tips 71, 81) to a workpiece, and the like can be reduced, and the rigidity of the equalizing guides 25a, 25b can be raised.

(6) The floating members 27a, 27b imparting a floating function to the equalizing guides 25a, 25b are not disposed in series in the axial direction relative to the equalizing guides 25a, 25b, but rather are disposed in parallel.

The overall length (length in axial direction) of the motor drive unit 30 can thereby be effectively shortened, whereby the motor drive unit 30 can be reduced in size.

(7) The encoder 60 is disposed at an intermediate position of the set of pressing guides 55a, 55b, and the ounce copper plate 92 is disposed at an intermediate position of the set of equalizing guides 25a, 25b and at an intermediate position of the set of floating members 27a, 27b.

The overall length (length in axial direction) of the motor drive unit 30 can thereby be effectively shortened, whereby the electric spot welding gun 10 can be reduced in size.

(8) By the ounce copper plate 92 being disposed at an intermediate position of the set of equalizing guides 25a, 25b and at an intermediate position of the set of floating members 27a, 27b, both sides of the ounce copper plate 92 can avoid the risk of being exposed to a direct hit of sputter accompanying welding, and thus the life-span of the ounce copper plate 92 is extended.

(9) By the ounce copper plate 92 being disposed at an intermediate position of the set of equalizing guides 25a, 25b and at an intermediate position of the set of floating members 27a, 27b, the ounce copper plate 92 itself can be directly connected to the transformer 90.

The secondary conductor required in a case of a structure in which the ounce copper plate 92 cannot be directly connected to the transformer 90 is no longer necessary, whereby the number of components can be reduced.

(10) By directly connecting the ounce copper plate 92 itself to the transformer 90, the conductor path in which welding current flows is shortened, the resistance of the conductor declines, and thus the output load of the transformer can be reduced. Furthermore, the cooling water path for cooling the conductor can be shortened.

What is claimed is:

1. An electric spot welding gun comprising:
a hollow housing;
a servo motor disposed in said housing and comprising a rotor having a rotational axis;
a push rod that advances and retracts according to rotation of the rotor of the servo motor;
a first electrode tip that is mounted to an arm fixed to a leading end of the push rod;
an encoder that detects a rotational angle of the rotor of the servo motor, the encoder disposed inside of said housing and having a rotational axis; and
a set of pressing guides that are fixed by the arm integrally with the push rod and extend in parallel with the push rod,
wherein a position of the first electrode tip is offset laterally relative to an axis of the push rod,
wherein the rotational axis of the rotor and the rotational axis of the encoder are disposed in parallel to and offset laterally relative to each other and to an opposite side in which the first electrode tip is offset, in an offset plane in which the electrode tip is offset relative to the axis of the push rod, wherein a trailing end of the rotor on a side opposite a push rod side thereof, and an input end of the encoder are facing the same direction, and
wherein the pressing guides are spaced upwardly away from the push rod in a height direction of the housing and are offset to the opposite side in which the first electrode tip is offset, and the pressing guides interpose the offset plane therebetween so as to be disposed on both sides thereof.

2. An electric spot welding gun according to claim 1, further comprising:
a transformer;
a flexible conductor for flowing current from the transformer toward the first electrode tip; and
an equalizing mechanism that can absorb displacement of a work when a work is sandwiched between the first electrode tip and a second electrode tip opposing the first electrode tip, wherein the equalizing mechanism includes:
a set of equalizing guides that extend in parallel with the pressing guides; and
a set of floating members that impart a floating function to the set of equalizing guides,
wherein the set of pressing guides, the set of equalizing guides, and the set of floating members are disposed in this order from nearest the push rod,
wherein the encoder is disposed at an intermediate position between the pressing guides, and
wherein the flexible conductor is disposed at an intermediate position between the equalizing guides and an intermediate a position between the floating members.

3. The electric spot welding gun according to claim 2, wherein the equalizing mechanism comprises a set of left and right equalizing guides, and a set of left and right floating members that impart a floating function to the equalizing guides.

4. The electric spot welding gun according to claim 3, wherein the floating members comprise a damper disposed on one side of the spot welding gun, and a spring disposed on the other side thereof.

5. The electric spot welding gun according to claim 2, wherein the flexible conductor is attached to an end of the transformer proximate said second electrode tip.

6. The electric spot welding gun according to claim 1, wherein a first gear is provided attached to the rotor, a second gear is provided attached to the encoder, and said first and second gears are engaged with one another.

7. The electric spot welding gun according to claim 6, wherein the first gear is configured so that torque transmission is possible without backlash.

8. The electric spot welding gun according to claim 6, wherein the first and second gears define a common plane, and wherein the rotor and the encoder are both disposed primarily on the same side of said common plane.

9. An electric spot welding gun comprising:
a hollow housing;
a servo motor comprising a rotor rotatably mounted in said housing, said rotor having a rotational axis, wherein a first gear is provided attached to the rotor;
a push rod that advances and retracts according to rotation of the rotor;
a set of pressing guides that are attached at one end of a movable arm, fixed integrally with the push rod and extend in parallel therewith, the movable arm being fixed to a leading end of the push rod;
a first electrode tip that is mounted to an another end of the movable arm fixed to a leading end of the push rod; and
an encoder that detects a rotational angle of the rotor of the servo motor, the encoder disposed inside of said housing and having a rotational axis, wherein a second gear is provided attached to the encoder;
wherein the rotational axis of the rotor and the rotational axis of the encoder are disposed parallel to and laterally offset relative to each other in order to minimize the length of the spot welding gun, and said first and second gears are engaged with one another, and
the pressing guides are spaced upwardly away from the push rod in a height direction of the housing.

10. The electric spot welding gun according to claim 9, further comprising:
a transformer;
a flexible conductor for flowing current from the transformer toward the first electrode tip; and
an equalizing mechanism that can absorb displacement of a work when a work is sandwiched between the first electrode tip and a second electrode tip opposing the first electrode tip, wherein the equalizing mechanism includes a set of equalizing guides that extend in parallel with the pressing guides; and a set of floating members that impart a floating function to the set of equalizing guides,
wherein the set of pressing guides, the set of equalizing guides, and the set of floating members are disposed in this order from nearest the push rod;
wherein the encoder is disposed at a position between the pressing guides, and
wherein the flexible conductor is disposed at a position between the equalizing guides and between the floating members.

11. The electric spot welding gun according to claim 10, wherein the equalizing mechanism comprises a set of left and right equalizing guides, and a set of left and right floating members that impart a floating function to the equalizing guides.

12. The electric spot welding gun according to claim 11, wherein the floating members comprise a damper disposed on one side of the spot welding gun, and a spring disposed on the other side thereof.

13. The electric spot welding gun according to claim 10, wherein the flexible conductor is attached to an end of the transformer proximate said second electrode tip.

14. The electric spot welding gun according to claim 9, wherein the first gear is configured so that torque transmission is possible without backlash.

15. The electric spot welding gun according to claim 9, wherein the servo motor comprises a ball screw mechanism for moving the push rod to advance or retract the first electrode tip.

16. The electric spot welding gun according to claim 9, wherein the first and second gears define a common plane, and wherein the rotor and the encoder are both disposed primarily on the same side of said common plane.

* * * * *